United States Patent
Joung et al.

(10) Patent No.: US 7,881,218 B2
(45) Date of Patent: Feb. 1, 2011

(54) MOBILE WIMAX SIGNAL ANALYZING METHOD

(75) Inventors: Jin Soup Joung, Seongnam (KR); Kyung Min Ha, Seongnam (KR); Cheol Jin Lee, Seongnam (KR)

(73) Assignee: Innowireless Co., Ltd., Seongnam (KR)

( * ) Notice: Subject to any disclaimer, the term of this patent is extended or adjusted under 35 U.S.C. 154(b) by 244 days.

(21) Appl. No.: 12/097,838

(22) PCT Filed: Dec. 19, 2006

(86) PCT No.: PCT/KR2006/005543

§ 371 (c)(1), (2), (4) Date: Jun. 17, 2008

(87) PCT Pub. No.: WO2007/078068

PCT Pub. Date: Jul. 12, 2007

(65) Prior Publication Data

US 2008/0291841 A1 Nov. 27, 2008

(30) Foreign Application Priority Data

Jan. 2, 2006 (KR) .................. 10-2006-0000153

(51) Int. Cl.
*G01R 31/081* (2006.01)
(52) U.S. Cl. ..................... 370/252; 370/241
(58) Field of Classification Search .............. 370/328, 370/241; 455/442; 375/224
See application file for complete search history.

(56) References Cited

U.S. PATENT DOCUMENTS

| 5,884,178 | A | 3/1999 | Ericsson et al. | |
| 6,549,759 | B2 | 4/2003 | Arviv et al. | |
| 2002/0114305 | A1 | 8/2002 | Oyama et al. | |
| 2003/0053532 | A1* | 3/2003 | Cutler et al. | 375/224 |
| 2005/0201269 | A1 | 9/2005 | Shim et al. | |
| 2005/0232181 | A1 | 10/2005 | Park et al. | |
| 2005/0286408 | A1 | 12/2005 | Jin et al. | |
| 2005/0288028 | A1* | 12/2005 | Lim et al. | 455/442 |
| 2006/0203766 | A1* | 9/2006 | Kim et al. | 370/328 |

FOREIGN PATENT DOCUMENTS

JP 2005217963 A 8/2005

(Continued)

OTHER PUBLICATIONS

International Search Report dated Mar. 27, 2007.

(Continued)

*Primary Examiner*—Ricky Ngo
*Assistant Examiner*—David Oveissi
(74) *Attorney, Agent, or Firm*—Rothwell, Figg, Ernst & Manbeck, P.C.

(57) ABSTRACT

Disclosed herein is a method of analyzing portable Internet signals in a measuring instrument. The method includes the steps of (a) acquiring synchronization using a preamble included in a currently received frame, (b) acquiring the access parameters of a DL_MAP included in the frame, and checking the validity of the DL_MAP, (c) if, as a result of the check at step (b), the DL_MAP is determined to be valid, acquiring downlink parameters and burst configuration information by interpreting the DL_MAP, and (e) performing a variety of diagnoses, including evaluation of signal quality for each burst, using the parameters and the burst configuration information.

8 Claims, 7 Drawing Sheets

FOREIGN PATENT DOCUMENTS

| | | |
|---|---|---|
| JP | 2005303387 A | 10/2005 |
| JP | 2005303455 A | 10/2005 |
| JP | 2007020173 | 1/2007 |
| JP | 2007522760 T | 8/2007 |
| JP | 2007525134 T | 8/2007 |
| WO | WO 2005/088886 A1 | 9/2005 |

OTHER PUBLICATIONS

Japanese language version of Japanese Office Action for Application No. 2008-548388, dated Aug. 28, 2009, 3 pages.

* cited by examiner

【Figure 1】
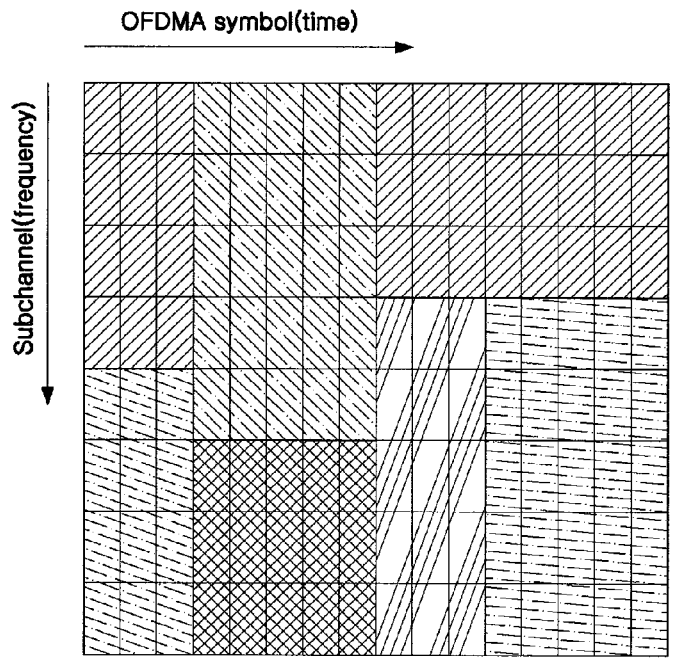
【Figure 2】
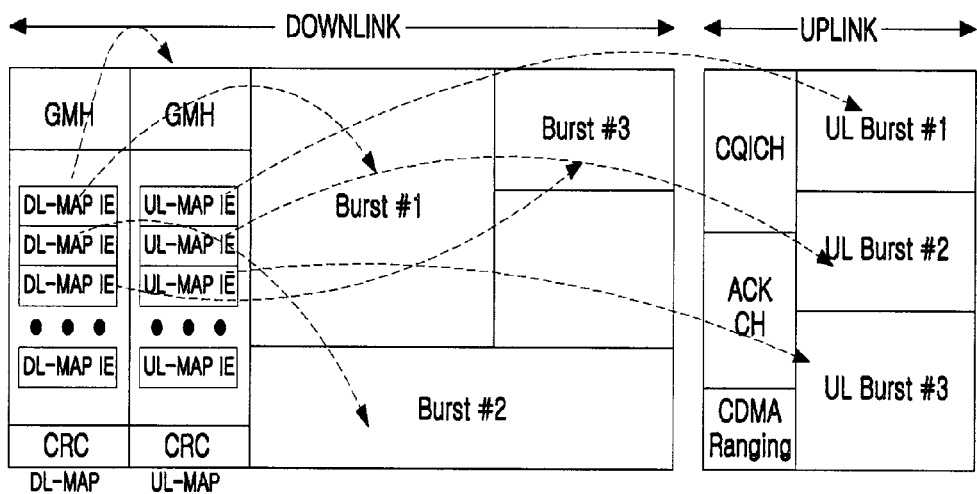

[Figure 3]

[Figure 4]
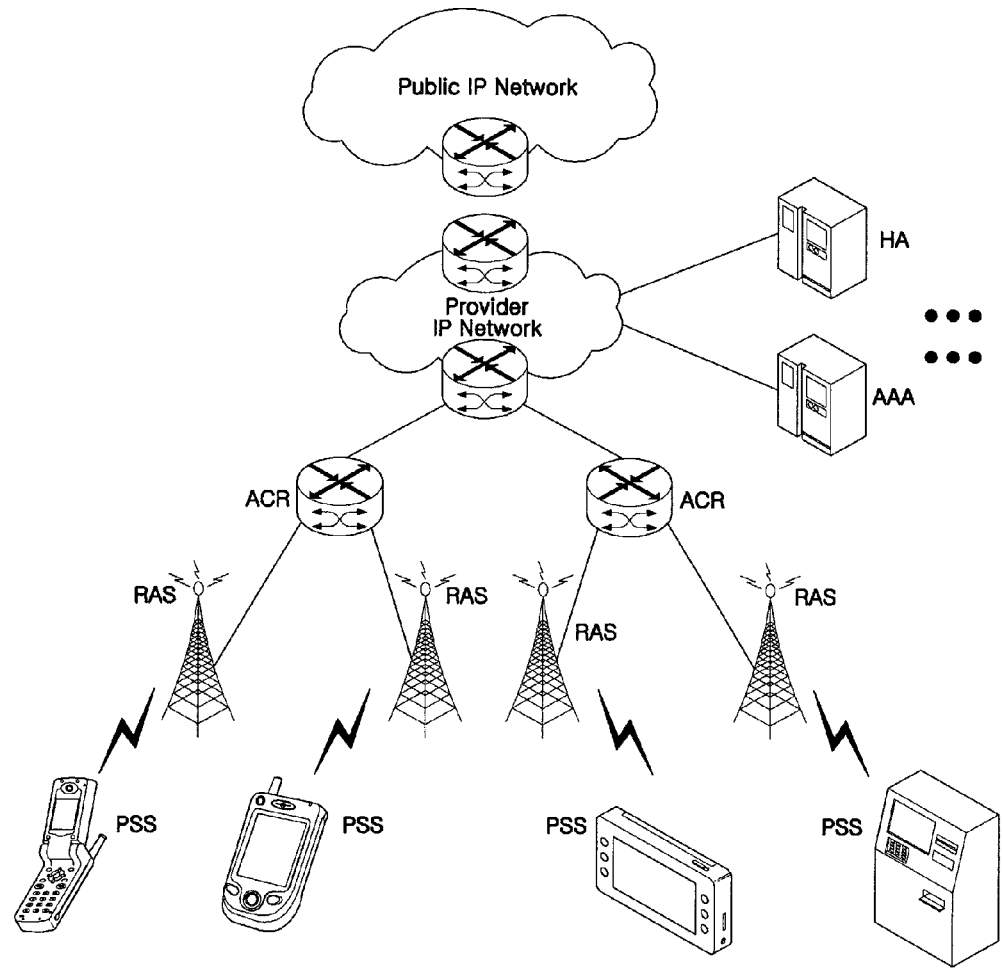

[Figure 5]
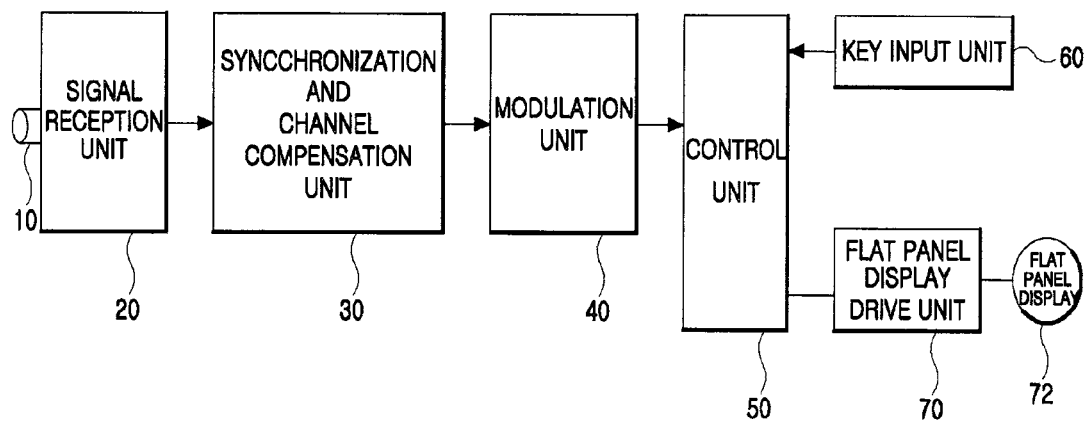
[Figure 6]
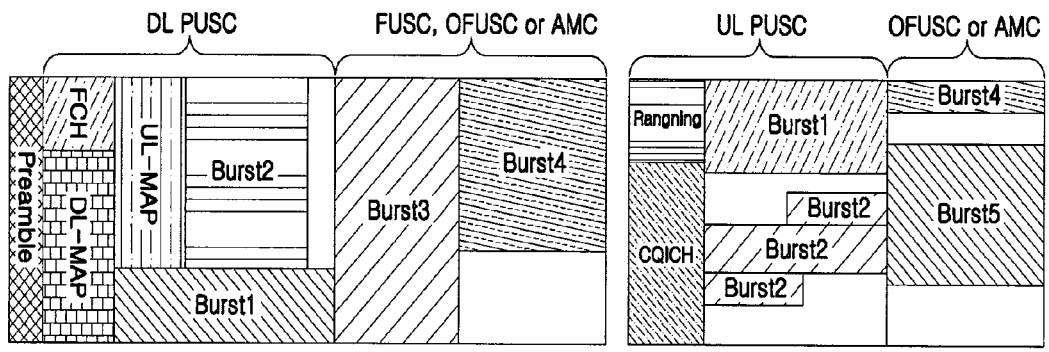

[Figure 7]
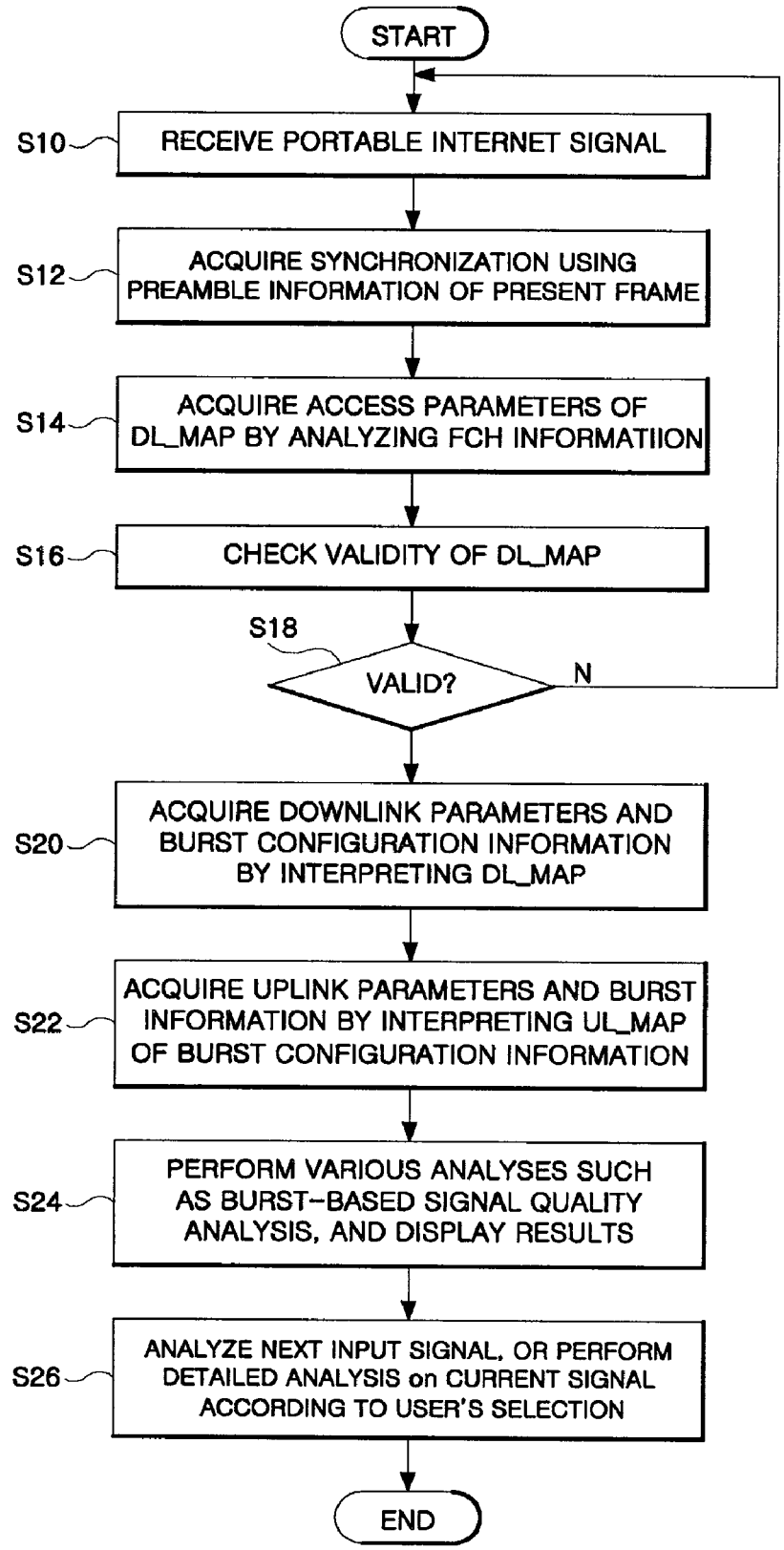

[Figure 8]
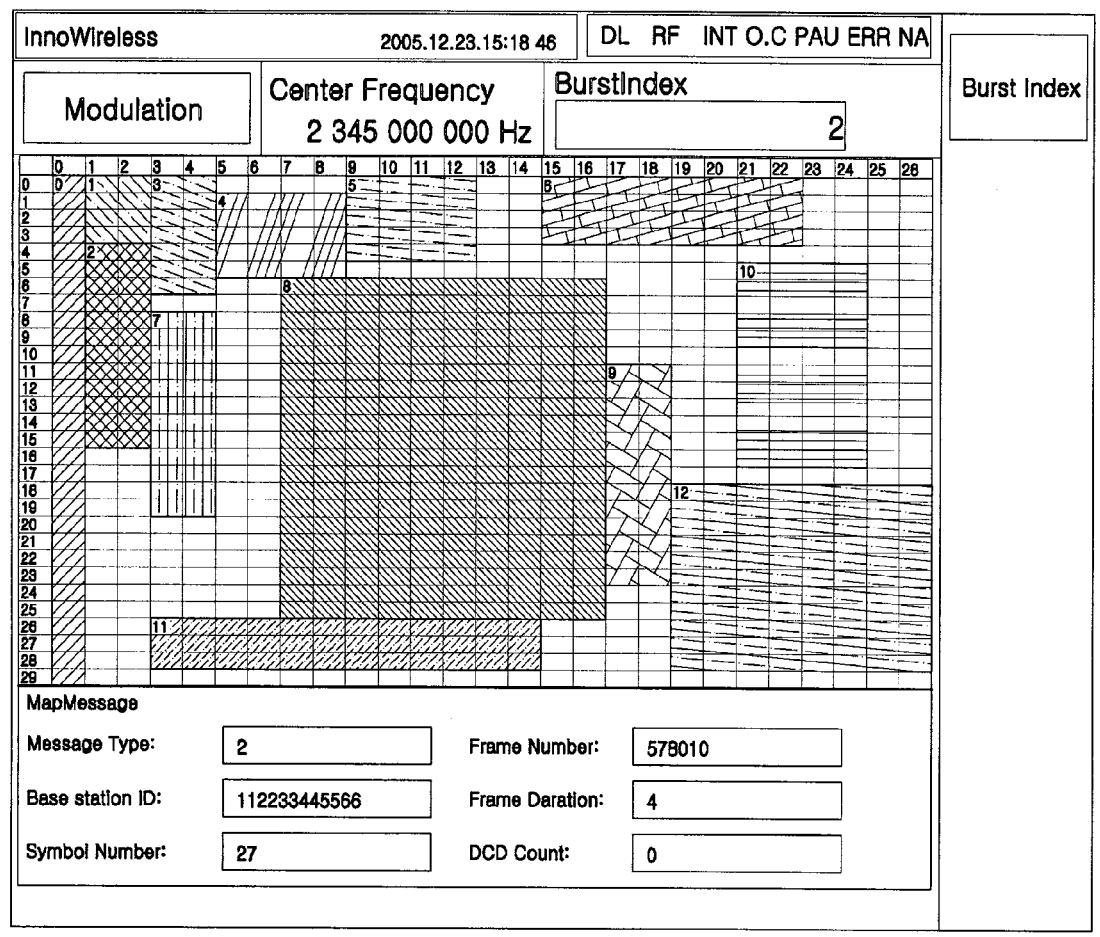

[Figure 9]
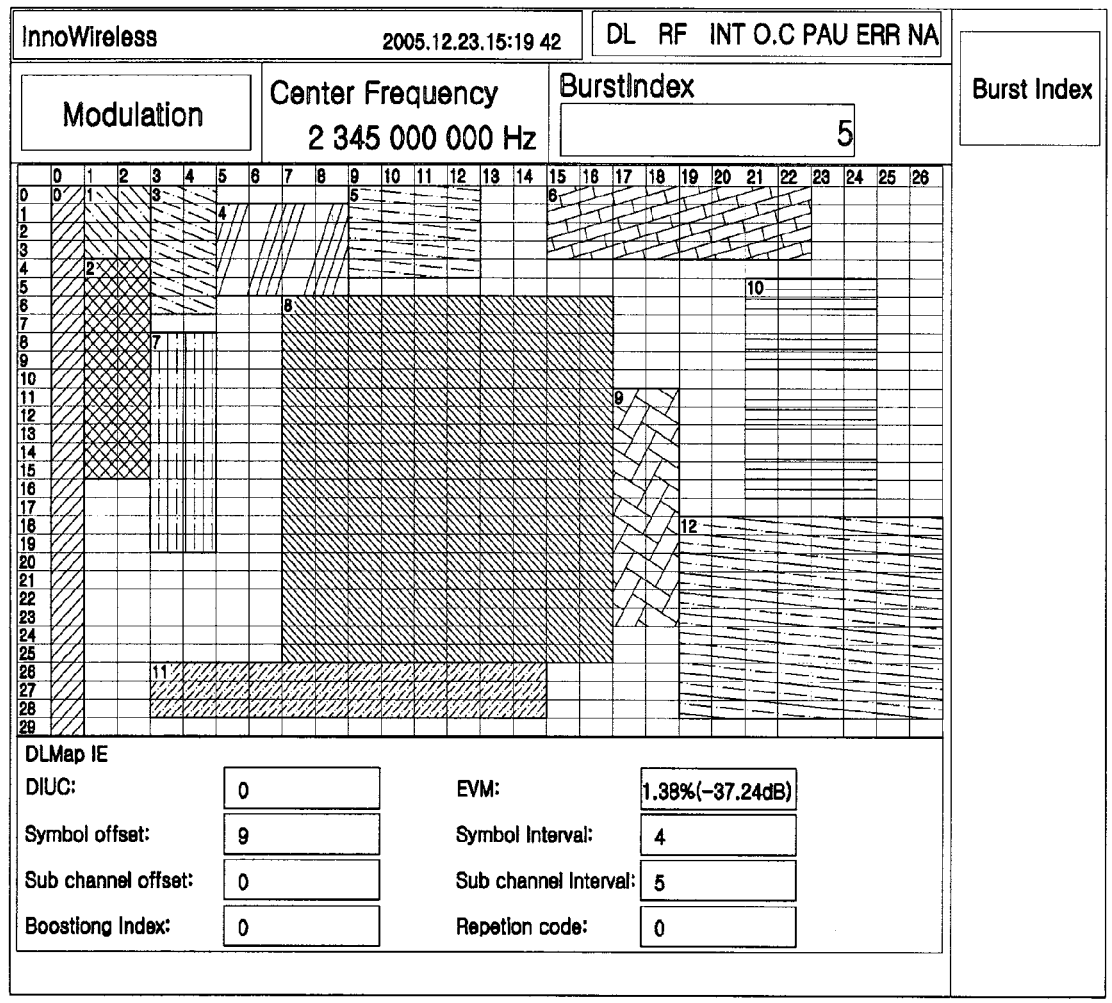

MOBILE WIMAX SIGNAL ANALYZING METHOD

CROSS REFERENCE TO RELATED APPLICATIONS

This application is a 35 USC §371 National Phase Entry Application from PCT/KR2006/005543, filed Dec. 19, 2006, and designating the United States. This application claims priority under 35 U.S.C. §119 based on Korean Patent Application No. 10-2006-0000153 filed Jan. 2, 2006, which is incorporated herein in its entirety.

TECHNICAL FIELD

The present invention relates, in general, to a method of analyzing portable Internet signals in a measuring instrument and, more particularly, to a method of analyzing portable Internet signals in a measuring instrument, which performs automatic analysis based on MAP information when analyzing Orthogonal Frequency Division Multiple Access-Time Division Duplex (OFDMA-TDD)-type portable Internet signals in the measuring instrument, so that more various and efficient analyses can be performed.

BACKGROUND ART

Up to now, methods of wirelessly accessing the Internet include a method of gaining access through a mobile telephone network based on a platform such as Wireless Application Protocol (WAP) or Wireless Internet Platform for Interoperability (WIPI), and a method of gaining access using a public wireless Local Area Network (LAN) and an access point. However, the method using a mobile telephone network has fundamental limitations when used as a universal Internet access means due to limitations related to screen size and the input interface, a measured rate-based charging system, etc. The method using a wireless LAN has fundamental problems in that it has a spatial limitation in that it can be used only within a radius of several tens of meters around an access point, and in that mobility is poor. In order to overcome the problems, Wireless Broadband Internet (WiBro) has been proposed as wireless Internet service that enables fast Internet access when not moving or when moving slowly, at Asymmetric Digital Subscriber Line (ADSL)-level quality and cost.

FIG. 1 is a diagram illustrating a resource allocation method of allocating resources based on time and frequency axes in an OFDMA method. Since radio resources, including time and frequency, are limited in a general communication system, the radio resources should be distributed to and then used by a plurality of terminal users. However, the portable Internet system adopts OFDMA, unlike systems such as the existing Code Division Multiple Access (CDMA) series and Wireless LAN (WLAN). OFDMA is a method of allocating two-dimensional resources, defined along time and frequency axes, to respective terminals, as illustrated in FIG. 1.

FIG. 2 is a diagram illustrating the MAP architecture of a portable Internet system. As illustrated in FIG. 2, the portable Internet system transmits pieces of data which use the same channel coding and modulation schemes in one bundle so as to increase efficiency. A set of data areas using the same channel coding and modulation schemes is referred to as one burst, and information about the location and size of each burst can be known through the MAP information of a frame, as illustrated in FIG. 2. Here, the term frame refers to a structured data sequence having a fixed duration which is used according to physical layer standards. A single frame may have both a downlink (DL) sub-frame, which is a link from a base station to a mobile station, and an uplink (UP) sub-frame, which is a link from a mobile station to a base station.

Since the portable Internet system adopts Time Division Duplex (TDD), in which transmission via an uplink and transmission via a downlink share the same frequency and are performed at different times, essential information, such as the length of one frame and the ratio of a downlink and an uplink to each other, is provided through the MAP information. A base station may transmit different MAPs via respective frames so as to dynamically allocate resources to respective terminals. In this case, each MAP may be divided into a DL_MAP having transmission information for the downlink, and a UL_MAP providing notification of resource access authority for an uplink. Here, the DL_MAP can be defined as a media access control layer message that defines the symbol offsets and sub-channel offsets of bursts, which are obtained through division and multiplexing on sub-channel and time axes by a base station on a downlink, and the numbers of symbols and the numbers of sub-channels, in which the symbols and the sub-channels are allocated resources. The UL_MAP can be defined as a set of pieces of information that define the entire connection for an uplink portion.

Meanwhile, the location information of the DL_MAP can be known using a predetermined different method, and the location information of the UL_MAP can be known only through the interpretation of the information of the DL_MAP. In the case of a downlink, a terminal analyzes MAP information defined in conformity with the standard specifications, and thus acquires information about a burst area containing desired content and parameters for an access method. In order to access information contained in each burst, the location information of the burst designated by the MAP must be considered, and a demodulation procedure must be performed according to a corresponding channel coding scheme (Convolutional Coding (CC), Convolutional Turbo Coding (CTC), Low Density Parity Check (LDPC) Coding, etc.), a corresponding coding transmission rate (½, ⅔, ¾, ⅚, etc.) and a corresponding modulation scheme (QPSK, 16QAM, 64QAM, etc.).

Meanwhile, since a measuring instrument for signal quality analysis at a base station of a portable Internet system focuses on signal analysis at a physical layer level, such a complex procedure has not been considered. However, in the case of an OFDMA-TDD-based system, such as the portable Internet, if the system does not know MAP information, the provision of reliable information at the physical layer level cannot be guaranteed. For example, in the case of Error Vector Magnitude (EVM), accurate analysis can be made for the provision of useful information, an only when burst location information in a frame and a modulation method are known.

Figure 3:
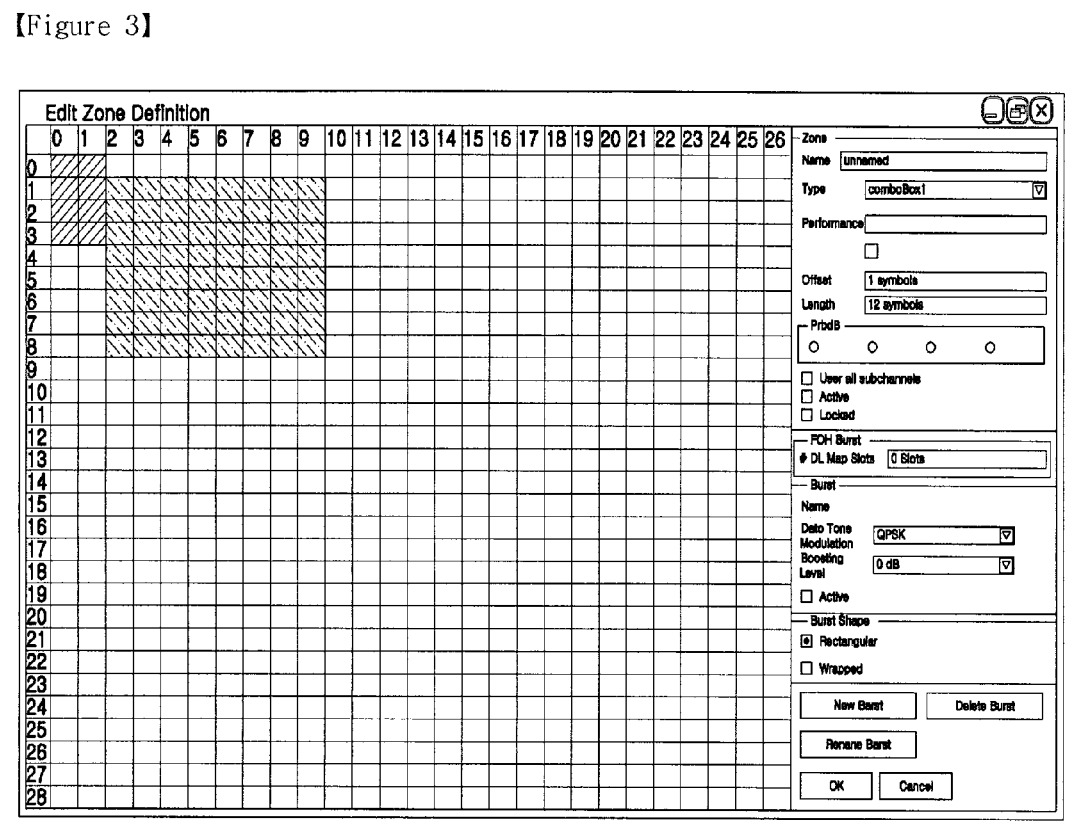

FIG. 3 is a diagram illustrating a prior art advanced method of analyzing portable Internet signals in a measuring instrument. As illustrated in FIG. 3, the prior art advanced measuring instrument adopts a method in which, in a state in which a user knows in advance various pieces of information, such as a modulating method and the location information of a burst for an input signal, the user directly inputs the information through the input interface screen of a personal computer, as illustrated in FIG. 3, performs designation, and then analyzes it, that is, a manual burst analysis method.

However, the above method has disadvantages in that the user must directly manage the related parameters of all the waveform files which were created for testing, a lot of time is taken and analysis is inaccurate when manipulation is unskilled, and accurate analysis is impossible because the location information of each burst, a modulation method and the time ratio of an uplink and a downlink to each other may be dynamically changed in an actual communication system. Furthermore, since a separate personal computer, which is equipped with an interface connected to a measuring instrument and configured to receive the manual input of various pieces of information for signal analysis from the user, is required, in addition to the measuring instrument, there is a problem in that the system becomes complicated.

DISCLOSURE

Technical Problem

Accordingly, the present invention has been made keeping in mind the above problems occurring in the prior art, and an object of the present invention is to provide a method of analyzing portable Internet signals in a measuring instrument, in which, at the time of analyzing Orthogonal Frequency Division Multiple Access-Time Division Duplex (OFDMA-TDD)-type portable Internet signals in the measuring instrument, the access authority parameters of an uplink and a downlink are acquired by automatically performing the analysis of a MAP included in a portable Internet signal, and then final analysis is performed, so that fast, various, and accurate analyses can be performed on a burst required to be analyzed.

Technical Solution

In order to accomplish the above object, the present invention provides a method of analyzing portable Internet signals in a measuring instrument, including the steps of (a) acquiring synchronization using a preamble included in a currently received frame; (b) acquiring the access parameters of a DL_MAP included in the frame, and checking the validity of the DL_MAP; (c) if, as a result of the check at step (b), the DL_MAP is determined to be valid, acquiring downlink parameters and burst configuration information by interpreting the DL_MAP; and (e) performing a variety of diagnoses, including evaluation of signal quality for each burst, using the parameters and the burst configuration information.

ADVANTAGEOUS EFFECTS

According to the above-described method of analyzing portable Internet signals in a measuring instrument according to the present invention, the access authority parameters of an uplink and a downlink are acquired by automatically performing the analysis of a MAP included in a portable Internet signal, and then final analysis is performed, so that fast, various, and accurate analyses can be performed, and also various analyses can be performed using only a measuring instrument, without using a separate personal computer.

DESCRIPTION OF DRAWINGS

FIG. 1 is a diagram illustrating a resource allocation method of allocating resources based on time and frequency axes in an OFDMA method;

FIG. 2 is a diagram illustrating the MAP architecture of a portable Internet system;

FIG. 3 is a diagram illustrating a prior art advanced method of analyzing portable Internet signals in a measuring instrument;

FIG. 4 is a diagram illustrating the network configuration of a general portable Internet system;

FIG. 5 is a block diagram showing the hardware of a portable Internet signal measuring instrument, in which the signal analysis method of the present invention is performed;

FIG. 6 is a diagram illustrating the structure of a Time Division Duplex (TDD) frame of a general portable Internet system;

FIG. 7 is a flowchart illustrating the signal analysis method of the present invention;

FIG. 8 is a diagram showing an illustrative screen for all of the information of a downlink that includes a DL_MAP obtained using the MAP information-based signal analysis method according to the present invention; and FIG. 9 is a diagram showing another illustrative screen for all of the information of a downlink that includes a DL_MAP obtained using the MAP information-based signal analysis method according to the present invention.

DESCRIPTION OF REFERENCE NUMERALS OF PRINCIPAL ELEMENTS IN DRAWINGS

10: RF input terminal
20: signal reception unit
30: synchronization and channel compensation unit
40: modulation unit
50: control unit
60: key input unit
70: flat panel display driving unit
72: flat panel display

MODE FOR INVENTION

With reference to the accompanying drawings, preferred embodiments of a method of analyzing a portable Internet signals in a measuring instrument will be described in detail below.

FIG. 4 is a diagram illustrating the network configuration of a general portable Internet system. As illustrated in FIG. 4, the basic network configuration of a portable Internet system includes a portable subscriber station, a radio access station, and an access control router. In the above-described configuration, the Portable Subscriber Station (PSS) performs the functions of portable Internet wireless connection, Internet Protocol (IP)-based service connection, IP mobility, terminal/user authentication and security, multicast service reception and interworking with another network. Meanwhile, the Radio Access Station (RAS) performs the functions of wireless portable Internet connection, radio resource management and control, mobility (handoff) support, authentication and security, the provision of Quality of Service (QoS), downlink multicast, billing, the creation of statistics information, and notification. Finally, the Access Control Router (ACR) performs the functions of IP routing, and mobility management, authentication and security, the provision of QoS, IP multicast, the provision of billing service for a billing server, the control of mobility between RASs in the ACR, and resource management and control.

The following Table 1 is a table that shows principal parameters and essential requirements in a portable Internet system. As illustrated in Table 1, it can be seen that the portable Internet system, which is the analysis target of the present invention, uses TDD as a duplex method and OFDMA as a multiple access method.

TABLE 1

| Idem | Method or value |
|---|---|
| Duplex method | TDD |
| Multiple access method | OFDMA |
| System bandwidth | 10 |
| Transmission rate per subscriber | uplink minimum/maximum 128 Kbps/1 Mbps downlink minimum/maximum 512 Kbps/3 Mbps |
| Frequency reuse coefficient | 1 |
| Frequency efficiency | maximum frequency efficiency: downlink/uplink (6/2) average frequency efficiency: downlink/uplink (2/1) |
| Handoff | handoff between cells in RAS, Handoff between RASs, handoff between frequencies: 150 |
| Mobility | maximum 60/h |
| Service coverage | pico-cell: 100 m micro-cell: 400 m macro-cell: 1 m |

The following Table 2 is a table that shows the fundamental parameters of OFDMA in the case of a Partial Usage of Sub-Channel (PUSC) diversity sub-channel designated as an essential implementation option in the portable Internet system.

TABLE 2

| Variable | Variable value |
|---|---|
| System bandwidth | 10 |
| Sampling frequency ($F_s$) | 10 |
| Sampling interval ($1/F_s$) | 100 |
| FFT size ($N_{FFT}$) | 1024 |
| Number of sub-carriers used | 840 |
| Number of data sub-carriers | 720 |
| Number of pilot sub-carriers | 120 |
| Sub-carrier frequency interval | 9.765625 |
| Effective symbol time ($T_b = 1/f$) | 102.4 |
| CP time ($T_g = T_b/8$) | 12.8 |
| OFDMA symbol time ($T_s = T_b + T_g$) | 115.2 |
| TDD frame length | 5 |

FIG. 5 is a block diagram showing the hardware of a portable Internet signal measuring instrument in which the signal analysis method of the present invention is performed. As illustrated in FIG. 5, the portable Internet signal measuring instrument, in which the signal analysis method of the present invention is performed, includes a signal reception unit 20 for receiving a portable Internet signal from an RAS through a Radio Frequency (RF) input terminal 10, transforming the received signal into a baseband signal and then transforming the analog signal into a digital signal through Analog/Digital (A/D) sampling; a synchronization and channel compensation unit 30 for improving the quality of a distorted signal through a synchronization process of identifying the start point and cell information of the received signal, transformed into the digital signal by the signal reception unit 20, and through a compensation algorithm; a demodulation unit 40 for interpreting and classifying the respective pieces of information of a temporal signal having quality, improved through the synchronization and channel compensation unit 30, into a digital bit stream in conformity with the portable Internet specifications; a key input unit 60 for receiving the setting and input of various items required for signal analysis; a flat panel display 72 and the drive unit 70 thereof for displaying results obtained through analysis using the measuring instrument; and a control unit 50 for performing necessary analysis by integrally controlling the overall operation of the measuring instrument in accordance with the signal analysis method of the present invention, and then displaying the results thereof on the flat panel display 70.

In the above-described configuration, a cable or a radio frequency antenna may be connected to the RF input terminal 10 through one of the various connection jacks. The key input unit 60 may include numeral/character key buttons for inputting numerals and characters, various function key buttons, and a jog button for designating various indexes, including numerals and menu items in various menus. The flat panel display 70 may be implemented as a Liquid Crystal Display (LCD) panel or the like, and the control unit 40 may include a microprocessor, program memory for storing an algorithm for performing the signal analysis method of the present invention, and data memory for temporally storing various pieces of data generated in the signal analysis process.

FIG. 6 is a diagram illustrating the structure of a Time Division Duplex (TDD) frame of a general portable Internet system. As shown in FIG. 6, the downlink and the uplink of the TDD system are distinguished from each other according to transmission time. Downlink transmission may start with one preamble symbol, and uplink transmission may start with a control symbol. TTG (87.2 μs) and RTG (74.4 μs), which are safeguard times for distinguishing uplink transmission time from downlink transmission time, are respectively inserted between the downlink and the uplink and after a frame. The length of the frame has a fixed value of 5 ms. A downlink preamble may be used for initial synchronization, cell search, frequency offset, and channel estimation.

A 24-bit Frame Control Header (FCH) for transmitting frame configuration information comes immediately after one preamble symbol in the downlink. Then, a DL_MAP is positioned after the FCH, and includes the parameters of the downlink or the Information Elements (IE) of bursts to be transmitted. The DL_MAP has been encoded and modulated using predetermined methods such as ½ and QPSK, and a repetition code may be additionally used. Information about an encoding method, the number of repetitions and the number of allocated sub-channels for the DL_MAP is transmitted through the FCH. Meanwhile, a UL_MAP exists in an arbitrary burst among various bursts obtained from the results of the analysis of the DL_MAP. Therefore, the UL_MAP can be obtained after the analysis of bursts existing on the downlink.

FIG. 7 is a flowchart illustrating the signal analysis method of the present invention. It is noted that the control unit 40 performs the signal analysis method as long as no contrary description is given. As shown in FIG. 7. first, the control unit 40 receives data, that is, frame data, from the modulation unit 30 at predetermined periods, for example, 5 periods, at step S10. At step S12, the synchronization for the start point of the frame and corresponding cell information are acquired using the downlink preamble information of the currently received frame.

Next, at step S14, the access parameters of the DL_MAP can be acquired by analyzing FCH information included in the frame data. Since the FCH exists at a fixed location after a preamble and an access method follows a predetermined method, the FCH can be accessed at all times.

Next, whether the validity of DL_MAP included in currently received frame data is checked at steps S16 and S18. Such a validity check may be performed using, for example, a Cyclic Redundancy Check (CRC) value, located at the lower end of DL_MAP shown in FIG. 2. If, as a result of the check at step S18, the currently received DL_MAP is determined to be valid, the process proceeds to step S20 and then acquires downlink parameters and burst configuration information through the interpretation of the DL_MAP. As illustrated in FIG. 2, each DL_MAP includes a plurality of burst IEs, and a control IE. Each of the burst IEs includes the burst configuration information of each burst.

Referring back to FIG. 7, at step S22, the uplink parameters and the burst information are acquired from the burst configuration information, acquired at step S20, through the interpretation of the UL_MAP. Next, at step S24, various analyses, such as the analysis of signal quality for each burst, are performed, and analysis results are displayed on the flat panel display 72. Analyses, such as Error Vector Magnitude, Error Vector Spectrum, Error Vector Time, I/Q Constellation, Cell ID, Segment, DL_MAP information, UL_MAP information, DL_MAP IE and UL_MAP IE, may be performed.

Finally, at step S26, the process returns to a step S12 according to the user's selection, and then analyzes the next input signal or performs additional detailed analysis on a current analyzed screen when the jog button signal is input. Meanwhile, if, as a result of the check at step S18, the currently received DL_MAP is determined not to be valid, the process returns to step S10.

FIG. 8 is a diagram showing an illustrative screen for all of the information of a downlink that includes DL_MAP obtained using the MAP information-based signal analysis method according to the present invention. As shown in FIG. 8, it can be seen that the locations of a plurality of bursts (respective rectangular blocks), which are the two dimensionally allocated resources composed of symbol offsets on the horizontal axis and sub-channel offsets on the vertical axis, are automatically analyzed and illustrated. Also, in FIG. 8, the DL_MAP corresponding to burst index 2 is designated, and the various useful parameters of the downlink, which may be known through the DL_MAP, are shown.

FIG. 9 is a diagram showing another illustrative screen for all of the information of a downlink that includes a DL_MAP obtained using the MAP information-based signal analysis method according to the present invention. FIG. 9 shows burst information such as the Error Vector Magnitude (EVM) value of a general burst corresponding to burst index 5.

INDUSTRIAL APPLICABILITY

The method of analyzing portable Internet signals in a measuring instrument according to the present invention is not limited to the above-described embodiments, but can be variously modified and worked within a range that does not depart from the technical spirit of the present invention.

The invention claimed is:

1. A method of analyzing portable Internet signals in a measuring instrument, the measuring instrument comprising at least a signal reception unit, a synchronization and channel compensation unit, a demodulation unit, a control unit, a flat panel display and a flat panel display driving unit, the method comprising:

using the signal reception unit to receive a portable Internet signal, transform the received signal into a baseband signal and then transform the baseband signal into a digital signal through Analog/Digital (A/D) sampling;

using the synchronization and channel compensation unit to improve the quality of the received signal transformed into the digital signal through a synchronization process of identifying a start point and cell information of the digital signal and through a compensation algorithm;

using the demodulation unit to interpret and classify the respective pieces of information of the digital signal having improved quality into a digital bit stream in conformity with portable Internet specifications; and using the control unit to:

(a) acquire synchronization using a preamble included in a currently received frame;

(b) acquire access parameters of a downlink_MAP (DL_MAP) included in the frame, and checking validity of the DL_MAP;

(c) acquire downlink parameters and burst configuration information by interpreting the DL_MAP if, as a result of the check at step (b), the DL_MAP is determined to be valid;

(e) perform a variety of diagnoses, including evaluation of signal quality for each burst, using the downlink parameters and the burst configuration information; and (f) display the diagnosed result in the flat panel display through the flat panel display driving unit.

2. The method according to claim 1, further comprising, between steps (c) and step (e), step (d) of using the control unit to acquire uplink parameters by analyzing an uplink_MAP (UL_MAP) included in the burst configuration information.

3. The method according to claim 2, wherein step (e) further comprises identifying the signal quality for each burst using a jog button.

4. The method according to claim 1, wherein the validity check at step (b) is performed using a Cyclic Redundancy Check (CRC) value included in the DL_MAP.

5. The method according to claim 4, wherein the access parameters of the DL_MAP comprise a length of a DL_MAP message and a repetitive encoding method of the DL_MAP message.

6. The method according to claim 5, wherein the variety of diagnoses at step (e) comprise Error Vector Magnitude, Error Vector Spectrum, Error Vector Time, I/Q Constellation, Cell ID, Segment, DL_MAP information, UL_MAP information, DL_MAP IE or UL_MAP IE.

7. The method according to claim 2, wherein the validity check at step (b) is performed using a Cyclic Redundancy Check (CRC) value included in the DL_MAP.

8. The method according to claim 3, wherein the validity check at step (b) is performed using a Cyclic Redundancy Check (CRC) value included in the DL_MAP.

* * * * *